United States Patent
Doner

(10) Patent No.: US 6,832,204 B1
(45) Date of Patent: Dec. 14, 2004

(54) TRAIN BUILDING PLANNING METHOD

(75) Inventor: John Doner, Melbourne, FL (US)

(73) Assignee: GE-Harris Railway Electronics, LLC, Melbourne, FL (US)

( * ) Notice: Subject to any disclaimer, the term of this patent is extended or adjusted under 35 U.S.C. 154(b) by 0 days.

(21) Appl. No.: 09/472,463

(22) Filed: Dec. 27, 1999

(51) Int. Cl.⁷ .............................................. G06F 17/60
(52) U.S. Cl. .................... 705/8; 705/7; 705/9; 705/10; 701/19; 701/117; 701/210
(58) Field of Search ............................. 705/7, 8, 9, 10; 701/19, 117, 210

(56) References Cited

U.S. PATENT DOCUMENTS

| | | | |
|---|---|---|---|
| 4,093,080 A | | 6/1978 | Schwarzkopf ............... 105/4.3 |
| 4,361,300 A | | 11/1982 | Rush ............................. 246/5 |
| 4,502,389 A | | 3/1985 | Theurer et al. ................ 104/2 |
| 5,177,684 A | * | 1/1993 | Harker et al. ............... 701/117 |
| 5,623,413 A | * | 4/1997 | Matheson et al. .......... 701/117 |
| 5,913,199 A | * | 6/1999 | Dueck et al. .................. 705/7 |
| 6,076,067 A | * | 6/2000 | Jacobs et al. .................. 705/7 |
| 6,135,396 A | | 10/2000 | Whitfield et al. ....... 246/182 R |
| 6,267,059 B1 | | 7/2001 | Brandt ..................... 73/504.16 |
| 6,304,801 B1 | * | 10/2001 | Doner .......................... 701/19 |
| 6,317,686 B1 | * | 11/2001 | Ran ............................ 701/210 |

FOREIGN PATENT DOCUMENTS

| | | | | |
|---|---|---|---|---|
| EP | SU 636119 A | * | 12/1978 | ............. B61B/1/00 |

OTHER PUBLICATIONS

Carey, M.; Kwiecinski, A., "Swapping the order of scheduled services to minimize expected costs of delays", Transportation Research, Part B (Methodological), Dec. 1994, vol. 28B, No. 6, p. 409–28.*

* cited by examiner

Primary Examiner—Tariq R. Hafiz
Assistant Examiner—Akiba Robinson-Boyce
(74) Attorney, Agent, or Firm—Armstrong Teasdale LLP

(57) ABSTRACT

A train building planning method is utilized to determine a state of a train yard and a status of resources within the yard. When a resource becomes available, a determination is made regarding possible options for the available resource. The affect of each option on the schedule of outbound trains is then evaluated. Specifically, a sum of the cost of late departures of outbound trains is determined and the option that provides a low, or no, cost of late departure is chosen.

9 Claims, 2 Drawing Sheets

TRAIN BUILDING PLANNING METHOD

BACKGROUND OF THE INVENTION

This invention relates generally to trains and, more particularly, to a method for planning a train build.

In a typical train switchyard, trains arrive, and segments of cars (cuts) are set out in a receiving yard. In due course, local switch engines move each cut to a classification yard, separating the cars out of the cut in the process and classifying the cars on distinct tracks of the classification yard. This classification segregates the incoming cars of any given cut for disparate destinations (i.e., for different outbound trains), and aggregates the specific cars into various blocks which are bound for a single destination. Any track in the classification yard at any moment may include a block of cars being assembled for an outbound train.

Once blocks of cars on the classification tracks are completed, another switching crew may move them to a set of departure tracks, where one or multiple blocks will comprise each outbound train. After all of the blocks for an outbound train are available on one of the departure tracks, assigned locomotives may be attached, followed by a final inspection. The train is then ready for departure.

Currently, railroads make train building process decisions manually, and individual yard masters have evolved "rules of thumb" by which trains are built. Rules of thumb may or may not provide the best solution possible, even if their application generally permits on-time train departures. For example, if the rules of thumb now utilized permit a certain yard throughput, in concordance with the normal flow of trains for the railroad, then those same rules might not support a substantial increase in yard throughput. But, if the railroads automate movement planning and dispatch, they will certainly obtain more capacity from their corridors. However, increased throughput ability will be wasted if the railroads obtain no additional capacity from their yards.

BRIEF SUMMARY OF THE INVENTION

In an exemplary embodiment of the invention, a train build is planned by determining a state of a train yard and then determining the status of resources within the yard. When a resource becomes free, or available, a determination is made regarding possible options for the available resource. The affect of each option on the schedule of outbound trains is then determined. Specifically, the cost of late departures of outbound trains is determined and the option that provides a low (or no) cost of late departure is chosen. If multiple options are available, the departure times of the outbound trains are determined and the option that provides a shortened departure time is chosen.

The method for planning a train build reduces costs associated with late outbound train departures. In addition, the overall timeliness of train departures is improved by reducing the time for building a train, thereby increasing the throughput of a train yard.

DETAILED DESCRIPTION OF THE INVENTION

Figure 1:
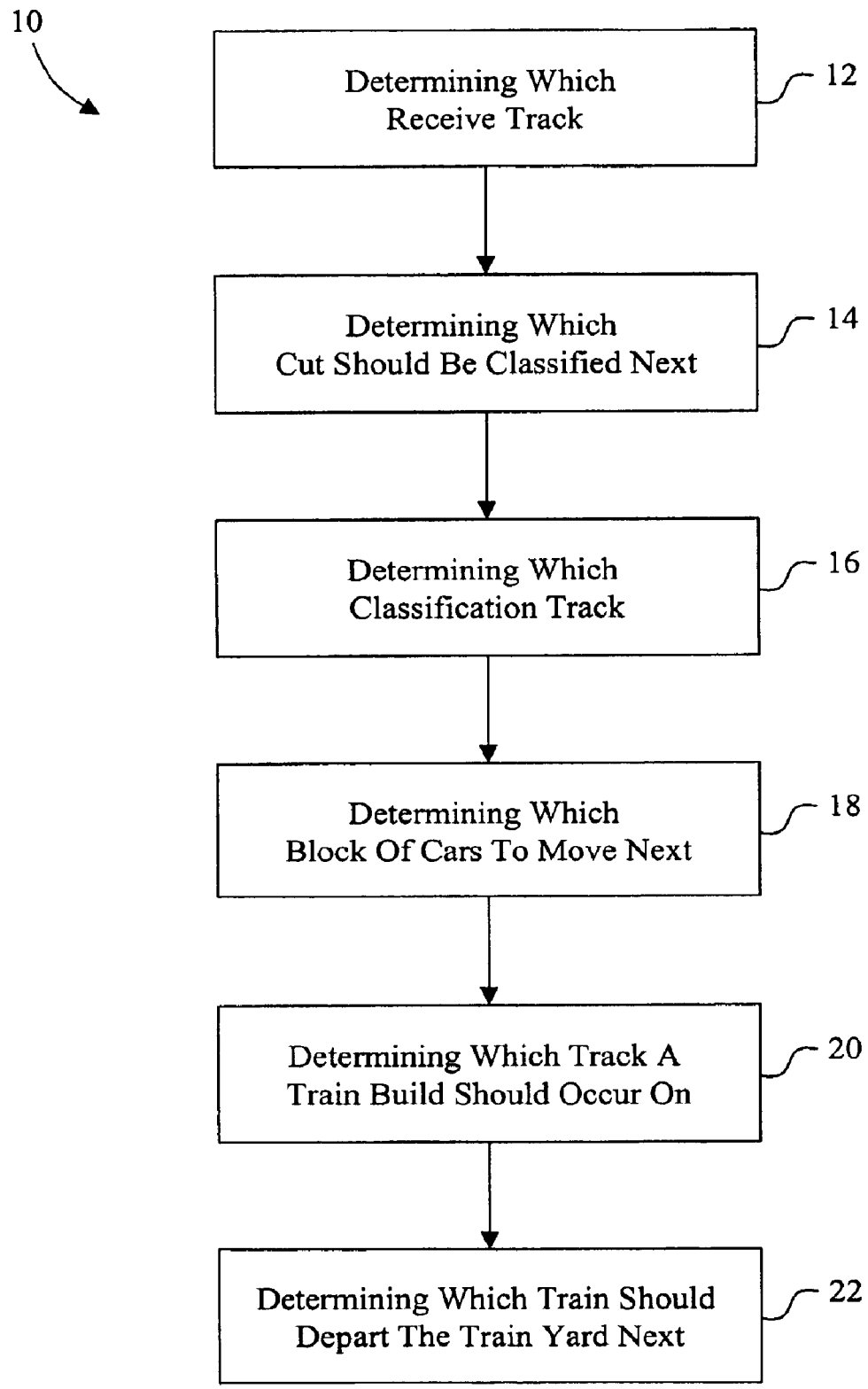
FIG. 1 is a flow chart of a train building process.

FIG. 1 is a flow chart of a train building process 10. Process 10 includes a plurality of decisions that when determined correctly increase the capabilities of the resources being utilized. Once a train building resource, i.e., a track, a switching engine, a yard crew member, becomes free or available, a yard master determines the next assignment of that resource. The decision made will complexly affect the overall timeliness of multiple outbound train departures.

In an exemplary embodiment, train building process 10 includes any number of resource classes or decisions, for example, six resource classes. Initially, a train arrives in a train yard and at least one cut is identified in the train. The first resource decision is determining 12 which receiving track each identified cut should be moved to. Eventually, all of the cuts in the train will be moved to receiving tracks. Another resource decision is made determining 14 which cut should be classified next. Since not all of the cars in the cut may be departing via a common route, multiple classification tracks may be utilized for a single cut of cars. A further resource decision is determining 16 which classification track should receive the next block of cars. Once the appropriate classification track has been identified, the cars that have been classified are then moved to the appropriate classification track. A block of cars is built on the appropriate classification track.

Train building process 10 also includes the resource decisions of determining 18 which block of cars should next be moved to a departure track and determining 20 which track a train build should occur on. The train is then built on the appropriate track with one or more blocks of cars. The next resource decision is determining 22 which train should depart the train yard next. The overall timeliness of a train departure depends on decisions 12–20. In an alternative embodiment, train building process 10 is implemented on a single set of tracks used interchangeably as the receive tracks, the classify tracks, and the departure tracks. In a further alternative embodiment, train building process 10 is implemented on two sets of tracks.

Figure 2:
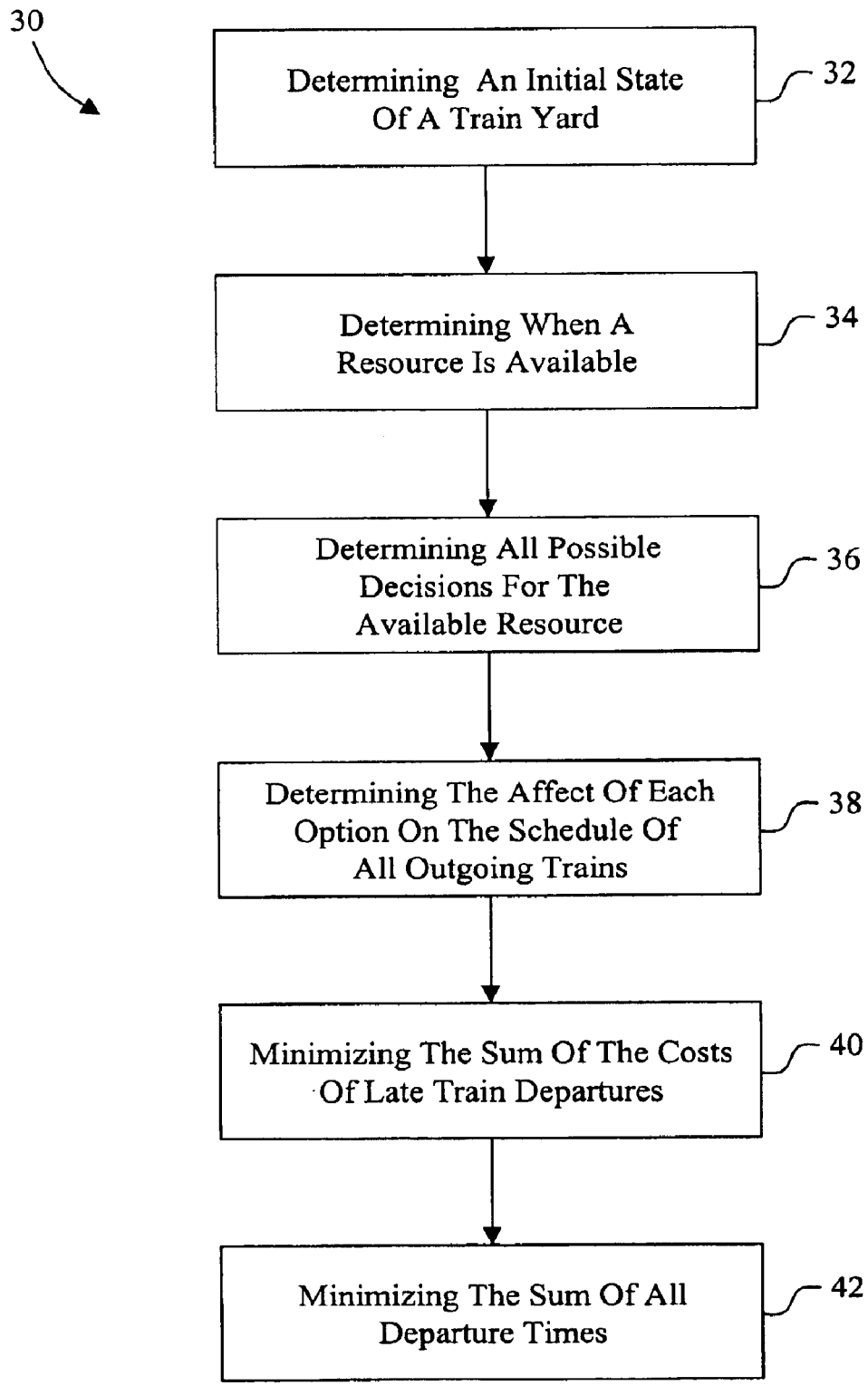
FIG. 2 is a flow chart of a method for planning a train build.

FIG. 2 is a flow chart of an exemplary method 30 for planning a train build. It has been determined that the productivity of a train yard increases when resources, i.e., a track, a switching engine, a yard crew member, are utilized in a manner which increases the on-time departure of outbound trains and increases train yard throughput. Method 30 includes determining 32 an initial state of the train yard and determining 34 when a resource is available. Whenever a resource becomes available, relative to train building process 10 (shown in FIG. 1), a decision is made determining 36 all possible options for the available resource. In order to determine the next use of the available resource, the realm of all possible options for that resource are initially regarded as acceptable. For example, the next inbound train needs a receive track, and all receive tracks available are considered.

The options are evaluated by determining 38 the affect of each option on the schedule of all outbound trains. One of the affects evaluated is determining the cost of late departures for each outbound train. In order to select one of the possible options, the evaluation includes minimizing 40 the sum of the costs of late outbound train departures. For this evaluation, let t=the current time,
S(t)=the train yard state are time t, this state is characterized in more detail as
   the known inbound train arrival schedule,
   the cuts and partial cuts currently on receive tracks,
   all current receive track assignments,
   the blocks and partial blocks on the classification tracks, all current classification track assignments,
the trains and partial trains on the departure tracks, and
all current train building process resource assignments $n_T(t)$=the number of outbound trains currently under consideration, $n_D$=the number of resource classes, $D_i$=the departure deadline for train $T_i$, $L_i$=the linearized cost (i.e., dollars/hour) for delay of train $T_i$ past $D_i$, $d_i(t)$=the apparent current ready time (available for departure) for train $T_i$ at time t, $\eta_1, \ldots, \eta_{n_D}$=the decisions corresponding to decisions 12–22, where FIG. 1 corresponds to $n_D$ equal to six, and $c_i(d_i)$=the cost of train $T_i$ departure at time $d_i$.

Based on the above variables and descriptions thereof, the function by which a decision is to be made regarding the above evaluation is given by $$F(\eta_1, \eta_2, \ldots \eta_{n_D}, S(t)) = \sum_{i=1}^{n_T} c_i(d_i),$$

which expresses the sum of the costs of late outbound train departures (if any) and is zero otherwise. When a given yard resource corresponding to decision $\eta_i$ becomes free, a value $\eta_i'$ within a realm $R_i$ of decisions for $\eta_i$ is selected satisfying the function $$F(\eta_1, \ldots \eta_i', \ldots, \eta_{n_D})=\min\{F(\eta_1, \ldots \eta_i, \ldots, \eta_{n_D})/\eta_i \epsilon R_i\}.$$

If more than one decision value obtains, then a choice from among the decision values is made minimizing 42 the sum of all departure times of the outbound trains, i.e., the function.

$$\partial(\eta_1, \eta_2, \ldots, \eta_{n_D}, S(t)) = \sum_{i=1}^{n_T} d_i(t).$$

The evaluation utilized to obtain the correct decision $\eta_i'$ from the realm $R_i$ is not limited to the exemplary embodiment explained above. It is to be understood that any of a wide range of techniques might be applied to method 30 that will provide the correct decision $\eta_i'$.

In one embodiment, where the number of decisions is equal to six, i.e., $n_D$ equals 6, the step of determining the sum of the costs of late departures utilizes the function $$F(\eta_1, \eta_2, \eta_3, \eta_4, \eta_5, \eta_6, S(t)) = \sum_{i=1}^{n_T} c_i(d_i)$$

wherein $\eta_1, \eta_2, \eta_3, \eta_4, \eta_5, \eta_6$ are train building process decisions;

S(t) is a state of the train yard at time t;

$n_T(t)$ is a number of outbound trains currently under consideration; and $d_i(t)$ is an apparent current ready time for train $T_i$ at time t. When a given yard resource corresponding to decision $\eta_i$ within a realm $R_i$ of decisions for $\eta_i$, an $\eta_i'$ is selected to satisfy the function $$F(\eta_1, \ldots \eta_i', \ldots, \eta_6)=\min\{F(\eta_1, \ldots \eta_i, \ldots, \eta_6)/\eta_i \epsilon R_i\}.$$

If more than one decision value obtains or is determined, then a choice from among the decision values is made by minimizing 42 the sum of all departure times of the outbound trains, i.e., the function $$\partial(\eta_1, \eta_2, \ldots, \eta_6, S(t)) = \sum_{i=1}^{n_T} d_i(t).$$

The evaluation utilized to obtain the correct decision $\eta_i'$ from the realm $R_i$ is not limited to the exemplary embodiment explained above. It is to be understood that any of a wide range of techniques might be applied to method 30 that will provide the correct decision $\eta_i'$.

In addition to the described linear cost function, $c_1(d_i)$, other non-linear or weighted cost functions may be utilized. More specifically and in one embodiment, the cost function applies defined or selected weights to different factors or resource variables depending upon a total amount of travel time for a selected train. For example, the cost function applies a first weight to the resource variables of a first train that is two hours late and having a total two day travel plan. A second weight is applied to resource variables of a second train that is two hours late and having a total travel time of six hours.

As described above, the low cost solution is determined for a selected or defined area. The selected area may include one yard, any number of yards, a defined geographic region or entire operations for a railroad. For example and in one embodiment, a total cost is determined for a selected area, having a plurality of yards, by combining the determined minimum or lowest cost solution for each yard. In another embodiment, the lowest cost solution is determined utilizing the decision values from the entire selected area, i.e., entire operation of railroad. Particularly, a cost solution for the entire selected area is determined without first determining a cost of each specific yard. Such an optimized selected area cost solution may result from a minimum or lowest cost for each yard, the cost solutions for some yards being the lowest and others not being optimized, or no individual yard cost solution being minimized.

Once the cost solutions are determined for a selected yard or entire railroad, the solutions may be transmitted or stored in a computer. This computer may be connected to a distributed processing system for access by a plurality of other users. For example and in one embodiment, each cost solution is accessible via a secure or non-secure web site on the internet. Such access allows various users to examine the cost solutions and as necessary take appropriate actions.

The above described method for planning a train build provides an efficient method for reducing costs associated with late outbound train departures. In addition, the method can improve the overall timeliness of train departures by reducing the time for building a train and thereby increasing the throughput of a train yard.

While the invention has been described in terms of various specific embodiments, those skilled in the art will recognize that the invention can be practiced with modification within the spirit and scope of the claims.

What is claimed is:

1. A computer implemented planning method for building trains in a train yard comprising a series of receiving tracks at the entry end of the train yard for receiving inbound trains to be classified and rebuilt, a bottleneck for cutting the trains into groupings of one or more railcars, a series of classification tracks for receiving the groupings of railcars, a series of departure tracks at the exit of the railyard for building outbound trains, and a bottleneck for directing railcars from the classification tracks to the departure tracks, said method comprising;

determining using a computer an initial state of railcar locations in the train yard;

determining using a computer an initial state of utilization of train building resources in the train yard;

determining using a computer whether a train building resource is available at the train yard for use in building departure trains;

determining using a computer possible uses for the available train building resource for building departure trains;

determining using a computer the affect on a schedule of departure trains for each possible use of the available train building resource to generate a preferred yard schedule; and building departure trains based on the preferred schedule for the departure trains including:
- cutting trains in the train yard into a plurality of blocks of one or more railcars;
- moving each block of railcars to at least one predetermined receiving track;
- moving railcars from at least one predetermined receiving track to at least one predetermined classification track based upon a departure route associated with the respective railcar; and
- moving a block of classified railcars from at least one predetermined classification track to a predetermined departure track.

2. A planning method in accordance with claim 1 wherein said step of determining the affect comprises the step of determining a cost of departures for each outbound train as $c_i(d_i)$, the cost of $T_i$ departure at time $d_i$.

3. A planning method in accordance with claim 2 wherein said step of determining the effect further comprises the step of determine the sum of the costs of late departures utilizing the function $$F(\eta_1, \eta_2, \ldots, \eta_{n_D}, S(t)) = \sum_{i=1}^{n_T} c_i(d_i)$$

wherein $\eta_1, \eta_2, \ldots, \eta_{n_D}$ are train building process decisions;

$S(t)$ is a state of the train yard at time t;

$n_T(t)$ is a number of outbound trains currently under consideration; and $d_i(t)$ is an apparent current ready time for train $T_i$ at time t.

4. A planning method in accordance with claim 1 wherein said step of determining possible uses for the available railcar resource comprises the step of determining a value $\eta_i'$ within a realm $R_i$ of decisions for $\eta_i$ satisfying $$F(\eta_1, \ldots \eta_i', \ldots, \eta_{n_D}) = \min\{F(\eta_1, \ldots \eta_i, \ldots, \eta_{n_D})/\eta_i \epsilon R_i\}$$

wherein $\eta_1, \eta_2, \ldots, \eta_{n_D}$ are train building process decisions.

5. A planning method in accordance with claim 1 further comprising the step of minimizing departure times by minimizing the function $$\partial(\eta_1, \eta_2, \ldots, \eta_{n_D}, S(t)) = \sum_{i=1}^{n_T} d_i(t)$$

wherein $\eta_1, \eta_2, \ldots, \eta_{n_D}$ are train building process decisions;

$S(t)$ is a state of the train yard at time t;

$n_T(t)$ is a number of outbound trains currently under consideration; and $d_i(t)$ is an apparent current ready time for train $T_i$, at time t.

6. A planning method in accordance with claim 3 wherein $n_D=6$ and $\eta_1$, is determining which receive track;

$\eta_2$ is determining which cut should be classified next;

$\eta_3$ is determining which classification track;

$\eta_4$ is determining which block of cars to move next;

$\eta_5$ is determining which track a train build should occur on; and $\eta_6$ ids determining which train should depart the train yard next.

7. A planning method in accordance with claim 1 further comprising the step of maximizing throughput of railcars from a train yard.

8. A planning method in accordance with claim 1 further comprising the step of minimizing a cost of throughput of railcars from a train yard.

9. The method of claim 1 wherein the train building resources comprise one of the group of switching engine, railyard personnel and railyard track.

* * * * *

UNITED STATES PATENT AND TRADEMARK OFFICE
CERTIFICATE OF CORRECTION

PATENT NO. : 6,832,204 B1
DATED : December 14, 2004
INVENTOR(S) : Doner

It is certified that error appears in the above-identified patent and that said Letters Patent is hereby corrected as shown below:

Column 6,
Line 35, delete "ids" and insert -- is --.

Signed and Sealed this

Thirty-first Day of January, 2006

JON W. DUDAS
*Director of the United States Patent and Trademark Office*